United States Patent
Sabo et al.

(10) Patent No.: US 8,970,547 B2
(45) Date of Patent: Mar. 3, 2015

(54) NOISE-ADAPTING TOUCH SENSING WINDOW

(71) Applicant: Synaptics Incorporated, Santa Clara, CA (US)

(72) Inventors: David S. Sabo, Scotts Valley, CA (US); Erol Eryilmaz, Los Altos Hills, CA (US); Petr Shepelev, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 244 days.

(21) Appl. No.: 13/728,567

(22) Filed: Dec. 27, 2012

(65) Prior Publication Data

US 2013/0194229 A1 Aug. 1, 2013

Related U.S. Application Data

(60) Provisional application No. 61/593,711, filed on Feb. 1, 2012.

(51) Int. Cl.
- *G06F 3/045* (2006.01)
- *G06F 3/044* (2006.01)
- *G06F 3/041* (2006.01)

(52) U.S. Cl.
CPC .............. *G06F 3/044* (2013.01); *G06F 3/0412* (2013.01); *G06F 3/0418* (2013.01)
USPC .......................................... 345/174; 345/173

(58) Field of Classification Search
None
See application file for complete search history.

(56) References Cited

U.S. PATENT DOCUMENTS

| | | | |
|---|---|---|---|
| 5,093,655 | A | 3/1992 | Tanioka et al. |
| 5,392,058 | A | 2/1995 | Tagawa |
| 5,534,892 | A | 7/1996 | Tagawa |
| 5,896,120 | A | 4/1999 | Iguchi et al. |
| 6,219,113 | B1 | 4/2001 | Takahara |
| 6,239,788 | B1 | 5/2001 | Nohno et al. |
| 7,031,886 | B1 | 4/2006 | Hargreaves |
| 7,451,050 | B2 | 11/2008 | Hargreaves |
| 7,633,566 | B2 | 12/2009 | Utsunomiya et al. |
| 2004/0095336 | A1 | 5/2004 | Hong et al. |
| 2004/0217945 | A1 | 11/2004 | Miyamoto et al. |
| 2006/0012575 | A1 | 1/2006 | Knapp et al. |
| 2006/0114247 | A1 | 6/2006 | Brown |
| 2007/0074914 | A1 | 4/2007 | Geaghan et al. |
| 2007/0262966 | A1 | 11/2007 | Nishimura et al. |

(Continued)

FOREIGN PATENT DOCUMENTS

| | | |
|---|---|---|
| CN | 101051256 A | 10/2007 |
| CN | 1940842 B | 5/2010 |

(Continued)

*Primary Examiner* — Joseph Haley
*Assistant Examiner* — Ifedayo Iluyomade
(74) *Attorney, Agent, or Firm* — Patterson + Sheridan, LLP

(57) ABSTRACT

Embodiments of the invention generally provide an input device with display screens that periodically update (refresh) the screen by selectively driving electrodes corresponding to pixels in a display line, while also using the display screen as a touch area for capacitive sensing. To do this, the input device uses common electrodes for both updating the display and performing capacitive sensing, and interleaves periods of capacitive sensing between periods of updating the display lines (and pixels) based on a display frame. To avoid noise and mitigate interference during capacitive sensing, the input device may switch which windows of time in a display frame are used as capacitive sensing periods based on measurements of interference.

20 Claims, 6 Drawing Sheets

(56) References Cited

U.S. PATENT DOCUMENTS

| | | |
|---|---|---|
| 2008/0018581 A1 | 1/2008 | Park et al. |
| 2008/0048989 A1 | 2/2008 | Yoon et al. |
| 2008/0055267 A1 | 3/2008 | Wu et al. |
| 2008/0062139 A1 | 3/2008 | Hotelling et al. |
| 2008/0062140 A1 | 3/2008 | Hotelling et al. |
| 2008/0062147 A1 | 3/2008 | Hotelling et al. |
| 2008/0062148 A1* | 3/2008 | Hotelling et al. ............ 345/174 |
| 2008/0150901 A1 | 6/2008 | Lowles et al. |
| 2008/0180407 A1 | 7/2008 | Utsunomiya et al. |
| 2008/0309625 A1 | 12/2008 | Krah et al. |
| 2008/0309627 A1* | 12/2008 | Hotelling et al. ............ 345/173 |
| 2008/0309628 A1 | 12/2008 | Krah et al. |
| 2009/0009194 A1 | 1/2009 | Seguine |
| 2009/0160461 A1 | 6/2009 | Zangl et al. |
| 2009/0189867 A1 | 7/2009 | Krah et al. |
| 2009/0195511 A1 | 8/2009 | Cites et al. |
| 2009/0256818 A1 | 10/2009 | Noguchi et al. |
| 2010/0001973 A1 | 1/2010 | Hotelling et al. |
| 2010/0019780 A1 | 1/2010 | Bulea |
| 2010/0045635 A1 | 2/2010 | Soo |
| 2010/0060591 A1 | 3/2010 | Yousefpor et al. |
| 2010/0066692 A1 | 3/2010 | Noguchi et al. |
| 2010/0085324 A1 | 4/2010 | Noguchi et al. |
| 2010/0110040 A1 | 5/2010 | Kim et al. |
| 2010/0182273 A1 | 7/2010 | Noguchi et al. |
| 2010/0193257 A1 | 8/2010 | Hotelling et al. |
| 2010/0194695 A1 | 8/2010 | Hotelling et al. |
| 2010/0194696 A1 | 8/2010 | Chang et al. |
| 2010/0194697 A1 | 8/2010 | Hotelling et al. |
| 2010/0194698 A1 | 8/2010 | Hotelling et al. |
| 2010/0214262 A1 | 8/2010 | Ishizaki et al. |
| 2010/0225612 A1 | 9/2010 | Ishizaki et al. |
| 2010/0265210 A1 | 10/2010 | Nakanishi et al. |
| 2010/0289765 A1 | 11/2010 | Noguchi et al. |
| 2010/0295804 A1 | 11/2010 | Takeuchi et al. |
| 2010/0295824 A1 | 11/2010 | Noguchi et al. |
| 2010/0302202 A1 | 12/2010 | Takeuchi et al. |
| 2010/0309162 A1 | 12/2010 | Nakanishi et al. |
| 2010/0321034 A1 | 12/2010 | Hargreaves |
| 2010/0328239 A1 | 12/2010 | Harada et al. |
| 2010/0328255 A1 | 12/2010 | Ishizaki et al. |
| 2010/0328256 A1 | 12/2010 | Harada et al. |
| 2010/0328257 A1 | 12/2010 | Noguchi et al. |
| 2010/0328259 A1 | 12/2010 | Ishizaki et al. |
| 2010/0328274 A1 | 12/2010 | Noguchi et al. |
| 2010/0328291 A1 | 12/2010 | Ishizaki et al. |
| 2011/0050585 A1 | 3/2011 | Hotelling et al. |
| 2011/0210939 A1 | 9/2011 | Reynolds et al. |
| 2011/0210940 A1 | 9/2011 | Reynolds |
| 2011/0210941 A1 | 9/2011 | Reynolds et al. |
| 2011/0267305 A1 | 11/2011 | Shahparnia et al. |

FOREIGN PATENT DOCUMENTS

| | | |
|---|---|---|
| EP | 1936479 A1 | 6/2008 |
| EP | 1892605 A3 | 7/2008 |
| JP | 2006106853 A | 4/2006 |
| JP | 2007334606 A | 12/2007 |
| JP | 2008090623 A | 4/2008 |
| JP | 2010072581 A | 4/2010 |
| TW | 200945147 A | 11/2009 |
| WO | WO-03019346 A1 | 3/2003 |
| WO | WO-2004046905 A3 | 8/2004 |
| WO | WO-2006054585 A1 | 5/2006 |
| WO | WO-2007003108 A1 | 1/2007 |
| WO | WO-2007012256 A1 | 2/2007 |
| WO | WO-2007102238 A1 | 9/2007 |
| WO | WO-2008050507 A1 | 5/2008 |
| WO | WO-2010009655 A1 | 1/2010 |
| WO | WO-2010137727 A1 | 12/2010 |

\* cited by examiner

NOISE-ADAPTING TOUCH SENSING WINDOW

CROSS-REFERENCE TO RELATED APPLICATIONS

This application claims benefit of U.S. provisional patent application Ser. No. 61/593,711, filed Feb. 1, 2012 entitled "SYSTEM AND METHOD FOR INTERFERENCE AVOIDANCE FOR A DISPLAY DEVICE COMPRISING AN INTEGRATED SENSING DEVICE," which is herein incorporated by reference.

BACKGROUND OF THE INVENTION

1. Field of the Invention

Embodiments of the present invention generally relate to performing capacitance sensing while updating a display, or more specifically, modifying time periods used for capacitance sensing while updating a display to avoid interference and mitigate noise.

2. Description of Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY OF THE INVENTION

Embodiments of the invention generally provide processing system for a display device having an integrated capacitive sensing device. The processing system includes a plurality of common electrodes configured for display updating and capacitive sensing. The processing system includes a driver module comprising driver circuitry configured for coupling to the plurality of common electrodes and configured to drive the plurality of common electrodes for display updating and capacitive sensing. The driver module is configured to drive the plurality of common electrodes for capacitive sensing during a first capacitive sensing period of a first display frame and a second capacitive sensing period. The first capacitive sensing period comprises a first plurality of non-display update periods. The driver module is further configured to operate the plurality of common electrodes for interference sensing. The processing system further includes a receiver module configured to receive first resulting signals during the first capacitive sensing period, second resulting signals during the second capacitive sensing period, and a third resulting signal when the plurality of common electrodes are operated for interference sensing. The processing system includes a determination module configured to acquire a first capacitive image based on the first resulting signals, a second capacitive image based on the second resulting signals, and an interference measurement based on the third resulting signals. The determination module is configured to determine positional information based on the first capacitive image responsive to the interference measurement being less than a threshold value. The determination module is further configured to determine positional information based on the second capacitive image responsive to the interference measurement exceeding the threshold value.

Embodiments of the invention may further provide a method for operating a display device having an integrated capacitive sensing device. The method includes driving a plurality of common electrodes for capacitive sensing during a first capacitive sensing period of a first display frame and a second capacitive sensing period. The first capacitive sensing period comprises a first plurality of non-display update periods. The method includes operating the plurality of common electrodes for interference sensing, and receiving, from a plurality of receiver electrodes, first resulting signals during the first capacitive sensing period, second resulting signals during the second capacitive sensing period, and a third resulting signal when the plurality of common electrodes are operated for interference sensing. The method further includes determining a first capacitive image based on the first resulting signals, a second capacitive image based on the second resulting signals, and an interference measurement based on the third resulting signals. The method includes, responsive to the interference measurement being less than a threshold value, determining positional information based on the first capacitive image. The method further includes, responsive to the interference measurement exceeding the threshold value, determining positional information based on the second capacitive image.

Embodiments of the invention generally provide a display device having an integrated capacitive sensing device. The display device includes a plurality of common electrodes configured to be driven for display updating a plurality of display lines of a display screen of the display device and performing capacitive sensing. The display device includes a plurality of receiver electrodes, and processor coupled to the plurality of common electrodes and to the plurality of receiver electrodes. The processor is configured to drive the plurality of common electrodes for capacitive sensing during a first capacitive sensing period of a first display frame and a second capacitive sensing period. The first capacitive sensing period comprises a first plurality of non-display update periods. The processor is further configured to operate the plurality of common electrodes for interference sensing, and receive first resulting signals on at least one of the plurality of receiver electrodes while driving during the first capacitive sensing period, second resulting signals during the second capacitive sensing period, and a third resulting signal when the plurality of common electrodes are operated for interference sensing. The processor is configured to acquire a first capacitive image based on the first resulting signals, a second capacitive image based on the second resulting signals, and an interference measurement based on the third resulting signals. The processor is further configured to determine positional information based on the first capacitive image responsive to the interference measurement being less than a threshold value, and determine positional information based on the second capacitive image responsive to the interference measurement exceeding the threshold value.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
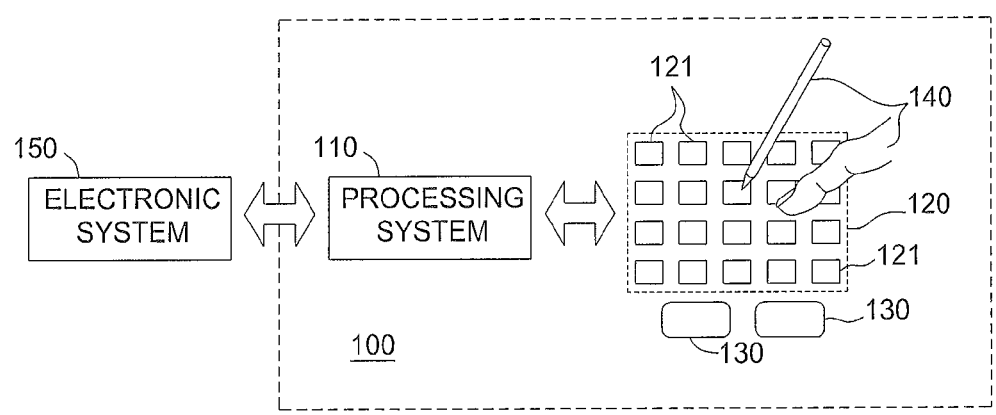
FIG. 1 is a schematic block diagram of an exemplary display device integrated with an input device, according to an embodiment described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present technology provide input devices and methods for improving usability. Input devices with display screens periodically update (refresh) the screen by selectively driving electrodes corresponding to pixels in the screen's display lines. In general, the input devices drive each electrode until each display line (and each pixel) of a display frame is updated. As used herein, a display frame includes the necessary information for updating, at least once, a defined portion of the display lines in a display screen. For example, if the input device updates the display screen sixty times a second, the input device receives sixty display frames which the input device uses to update each display line sixty times. Moreover, a display frame may not include all the display lines in the display screen. For example, only a portion of the display screen may be actively displaying an image, and thus, the display frames may contain only the data needed to update the display lines in the active portion.

In addition to updating the display, the input device may perform capacitive sensing using the display screen as a touch area. Moreover, the input device may interleave periods of capacitive sensing between periods of updating the display based on a display frame. For example, the input device may update the first half of the display lines of the display screen, pause display updating, perform capacitive sensing, and finish updating the rest of the display lines. In this manner, the time period necessary for updating a screen based on a single display frame includes one or more interleaved periods of capacitive sensing. Further still, the input device may use common electrodes as further described below for both updating the display and performing capacitive sensing.

In one embodiment, the periods of capacitive sensing may be dynamically varied to avoid interference and mitigate noise during sensing. For example, the input device may modify the timing of periods used for capacitive sensing relative to each display frame, use different transmitter signal frequencies to drive the common electrodes for capacitive sensing, or some combination thereof, based on detected interference. Modifying the timing of capacitive sensing periods may enable larger contiguous intervals for capacitive sensing, enabling the input device to increase a range of sensing frequencies for more effective frequency hopping. Further, modifying transmitting signal frequency enables the input device to select a quieter capacitive frame for capacitive sensing.

FIG. 1 is a block diagram of an exemplary input device 100, in accordance with embodiments of the present technology. In one embodiment, input device 100 comprises a display device having an integrated sensing device. Although embodiments of the present disclosure may be utilized in a display device integrated with a sensing device, it is contemplated that the invention may be embodied in display devices without integrated input devices. The input device 100 may be configured to provide input to an electronic system 150. As used in this document, the term "electronic system" (or "electronic device") broadly refers to any system capable of electronically processing information. Some non-limiting examples of electronic systems 150 include personal computers of all sizes and shapes, such as desktop computers, laptop computers, netbook computers, tablets, web browsers, e-book readers, and personal digital assistants (PDAs). Additional example electronic systems 150 include composite input devices, such as physical keyboards that include input device 100 and separate joysticks or key switches. Further example electronic systems 150 include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system 150, or can be physically separate from the electronic system 150. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements 121 for detecting user input. As several non-limiting examples, the input device 100 may use capacitive, elastive, resistive, inductive, magnetic acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements 121 pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements 121 to create electric fields. In some capacitive implementations, separate sensing elements 121 may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g., other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes. One embodiment of the processing system 110 is described in greater detail in conjunction with FIG. 2.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the user input (or lack of user input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen of the display device. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device may share physical elements. For example, some embodiments may utilize some of the same electrical components for displaying and sensing. As another example, the display device may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
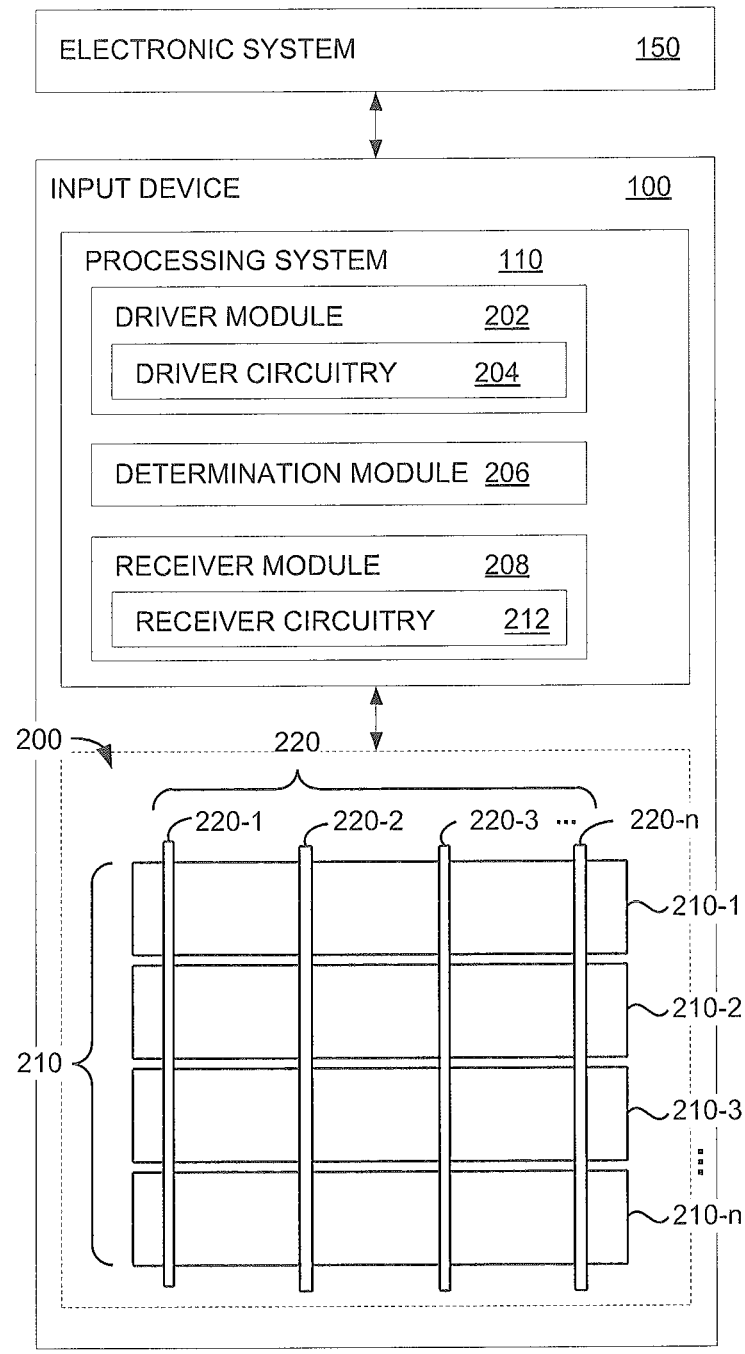
FIG. 2 illustrates a system for communicating between an electronic system and an input device that dynamically modifies timing windows for capacitive sensing, according to one embodiment disclosed herein.

FIG. 2 illustrates a system for communicating between an electronic system 150 and an input device 100 that dynamically modifies timing window for capacitive sensing, according to one embodiment disclosed herein. In one embodiment, an electronic system 150 is coupled to an input device 100. The electronic system 150 may transmit data, such as display frames, to the input device 100 for display. The input device 100, in one embodiment, may be configured to provide input to an electronic system 150, as well as receive and process display data transmitted from the electronic system 150. The input device 100 includes the processing system 110 and a sensor pattern 200. FIG. 2 shows a portion of an exemplary pattern 200 of sensing elements configured to sense in a sensing region 120 associated with the pattern, according to some embodiments. For clarity of illustration and description, FIG. 2 shows the sensing elements in a pattern of simple rectangles, and does not show various components. This pattern 200 of sensing elements comprises a plurality of transmitter electrodes 210 (210-1, 210-2, 210-3, . . . 210-n), and a plurality of receiver electrodes 220 (220-1, 220-2, 220-3, . . . 220-n) disposed over the plurality of transmitter electrodes 210.

Transmitter electrodes 210 and receiver electrodes 220 are typically ohmically isolated from each other. That is, one or more insulators separate transmitter electrodes 210 and receiver electrodes 220 and prevent them from electrically shorting to each other. In some embodiments, transmitter electrodes 210 and receiver electrodes 220 are separated by insulative material disposed between them at cross-over areas; in such constructions, the transmitter electrodes 210 and/or receiver electrodes 220 may be formed with jumpers connecting different portions of the same electrode. In some embodiments, transmitter electrodes 210 and receiver electrodes 220 are separated by one or more layers of insulative material. In some other embodiments, transmitter electrodes 210 and receiver electrodes 220 are separated by one or more substrates; for example, they may be disposed on opposite sides of the same substrate, or on different substrates that are laminated together.

The areas of localized capacitive coupling between transmitter electrodes 210 and receiver electrodes 220 may be termed "capacitive pixels." The capacitive coupling between the transmitter electrodes 210 and receiver electrodes 220 change with the proximity and motion of input objects in the sensing region associated with the transmitter electrodes 210 and receiver electrodes 220.

In some embodiments, the sensor pattern is "scanned" to determine these capacitive couplings. That is, the transmitter electrodes 210 are driven to transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and effectively produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes 220 to be independently determined.

The receiver sensor electrodes 220 may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

The background capacitance of a sensor device is the capacitive image associated with no input object in the sensing region. The background capacitance changes with the environment and operating conditions, and may be estimated in various ways. For example, some embodiments take "baseline images" when no input object is determined to be in the sensing region, and use those baseline images as estimates of their background capacitances.

Capacitive images can be adjusted for the background capacitance of the sensor device for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, transmitter electrodes 210 comprise one or more common electrodes (e.g., segments of a "V-com electrode") used in updating the display of the display screen. These common electrodes may be disposed on an appropriate display screen substrate. For example, the common electrodes may be disposed on the TFT glass in some display screens (e.g., In Plane Switching (IPS) or Plane to Line Switching (PLS)), on the bottom of the color filter glass of some display screens (e.g., Patterned Vertical Alignment (PVA) or Multi-domain Vertical Alignment (MVA)), coupled to one end of an organic light emitting diode (OLED) etc. In such embodiments, the common electrode can also be referred to as a "combination electrode", since it performs multiple functions. In various embodiments, each transmitter electrode 210 comprises one or more common electrodes. In other embodiments, at least two transmitter electrodes 210 may share at least one common electrode. While transmitter electrodes comprising common electrodes are expressly referred to herein, it should be recognized that the transmitter electrodes may be comprised of any display element that may be used for display updating and capacitive sensing, including source drivers, gate drivers, storage capacitors, etc. In some touch screen embodiments, receiver electrodes 220 may be comprised of one or more common electrodes.

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In some embodiments where the two rates differ, successive capacitive images are acquired at different display updating states, and the different display updating states may affect the capacitive images that are acquired. That is, display updating affects, in particular, the background capacitive image. Thus, if a first capacitive image is acquired when the display updating is at a first state, and a second capacitive image is acquired when the display updating is at a second state, the first and second capacitive images may differ due to differences in the background capacitive image associated with the display updating states, and not due to changes in the sensing region. This is more likely where the capacitive sensing and display updating electrodes are in close proximity to each other, or when they are shared (e.g., combination electrodes).

For convenience of explanation, a capacitive image that is taken during a particular display updating state is considered to be of a particular frame type. That is, a particular frame type is associated with a mapping of a particular capacitive sensing sequence with a particular display sequence. Thus, a first capacitive image taken during a first display updating state is considered to be of a first frame type, a second capacitive image taken during a second display updating state is considered to be of a second frame type, a third capacitive image taken during a first display updating state is considered to be of a third frame type, and so on. Where the relationship of display update state and capacitive image acquisition is periodic, capacitive images acquired cycle through the frame types and then repeats.

In one embodiment, the processing system 110 is configured to operate the hardware of the input device 100 to detect input in the sensing region—e.g., some portion of the display screen 112. The processing system 110 comprises parts of or all of one or more integrated circuits (ICs) and/or other circuitry components. In the embodiment shown, the processing system 110 includes at least a driver module 202, a receiver module 208, and a determination module 206.

In one embodiment, the driver module 202 may include driver circuitry 204 coupled to the plurality of common electrodes of the display screen 112 and configured to drive the hardware components for capacitive sensing, display updating, and interference measurement. The driver module 202 is configured to drive one or more of the common electrodes for display updating during display line update periods of a display frame, as described later. The driver module 202 may be configured to drive the common electrodes such that the display frames occur at a pre-determined display frame rate. In various embodiments, the transmitter electrodes and/or the receiver electrodes may be comprised of a plurality of common electrodes.

In one embodiment, the driver module 202 may be configured to drive the common electrodes for capacitive sensing during a first capacitive sensing period of a first display frame (e.g., a first plurality of non-display update periods) and a second capacitive sensing period. In some embodiments, the driver module is configured to operate the common electrodes for interference sensing. In some embodiments, the driver module 202 is configured to drive the common electrodes during the first capacitive sensing period at a first transmitter signal frequency and drive the common electrodes at a second transmitter signal frequency different from the first transmitter signal frequency.

In one embodiment, the receiver module 208 having receiver circuitry 212 is coupled to a plurality of receiver electrodes 220 and configured to receive and process resulting signals with the plurality of receiver electrodes 220. In some embodiments, the receiver module 208 is configured to receive first resulting signals during the first capacitive sensing period, second resulting signals during the second capacitive sensing period, and a third resulting signal when the plurality of common electrodes are operated for interference sensing.

In one embodiment, the determination module 206 is configured to determine an interference measurement based at least in part on the resulting signals from the receiver electrodes 220 and adjust a process for capacitive sensing based at least in part on interference measurements. In some embodiments, the determination module 206 is configured to acquire capacitive images based on resulting signals. In some embodiments, the determination module 206 is configured to determine positional information based on a capacitive image based on whether an interference measurement exceeds a threshold value.

In some embodiments, the determination module 206 is configured to shift from a first transmitter signal having a first transmitter signal frequency to a second transmitter signal having a second transmitter signal frequency to be used when driving the common electrodes for capacitive sensing during the second capacitive sensing period based on the interference measurement. In some embodiments, the determination module 206 is configured to switch the driver module 202 from a first timing scheme for driving the common electrodes for capacitive sensing during non-display update periods of a first type to a second timing scheme for driving the common electrodes for capacitive sensing during non-display update periods of a second type based on the interference measurement.

In some embodiments, the determination module 206 is configured to determine positional information based on both of the first and second capacitive images responsive to the interference measurement being less than the threshold value. In some embodiments, the determination module 206 is configured to determine positional information based on a comparison of the first capacitive image to a first baseline image if the interference measurement is less than a threshold value; otherwise, the determination module 206 determines positional information based on a comparison of the second capacitive image to a second baseline image. The determination module 206 may be configured to maintain first and second baseline images independently.

In some embodiments, the determination module 206 is configured to modify a ratio of capacitive images acquired using the first transmitter signal frequency to capacitive images acquired using the second transmitter signal frequency based on a comparison of interference measurements associated with the first transmitter signal frequency and the second transmitter signal frequency.

Noise-Adaptive Capacitive Sensing Between Display Line Updates

In one embodiment, the processing system 110 is configured to adaptively switch which periods of time within a display frame are used for capacitive sensing based on the measured noise affecting the input device. In some embodiments, the processing system 110 may switch between non-display update periods occurring between display line updates in low noise environments and non-display update periods occurring prior to the first display line update in a given display frame in high noise environments.

In some embodiments, the processing system 110 may be configured to switch to using non-display update periods that enable for extended "gear-shifting" of the sensing frequency used for capacitive sensing. Each "gear" represents a different amount of the non-display update period that is used for capacitive sensing. Further, each gear is related to a different transmitter signal frequency that is driven onto a common electrode set (e.g., transmitter electrode) for capacitive sensing. "Shifting" gears refers to using a different transmitter signal frequency for driving a common electrode set for capacitive sensing, and using a different amount of the non-display update period for capacitive sensing.

Figure 3:
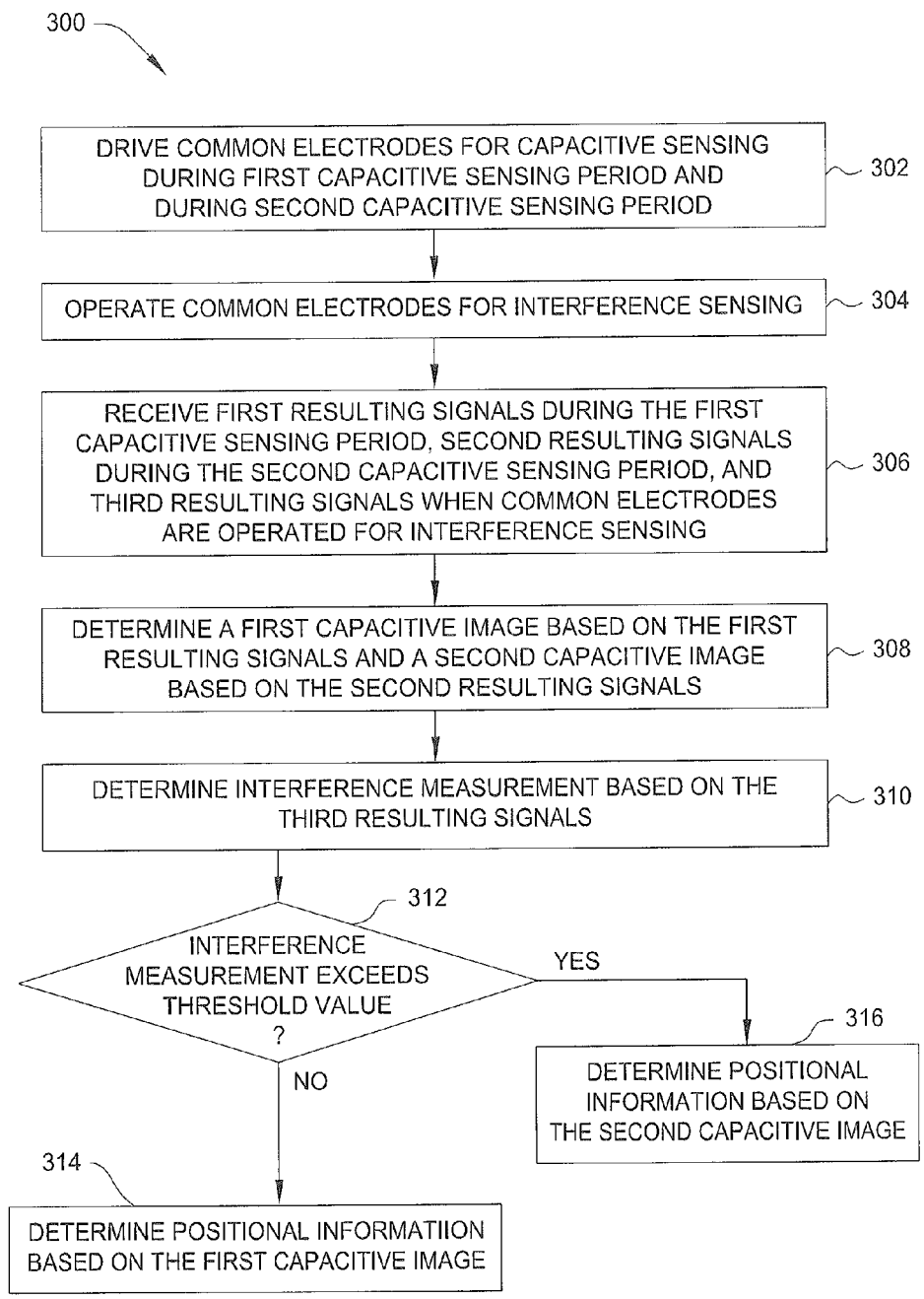
FIG. 3 illustrates a flow diagram of a method of mitigating noise for capacitance sensing with display updating, according to an embodiment disclosed herein.
Figure 4:
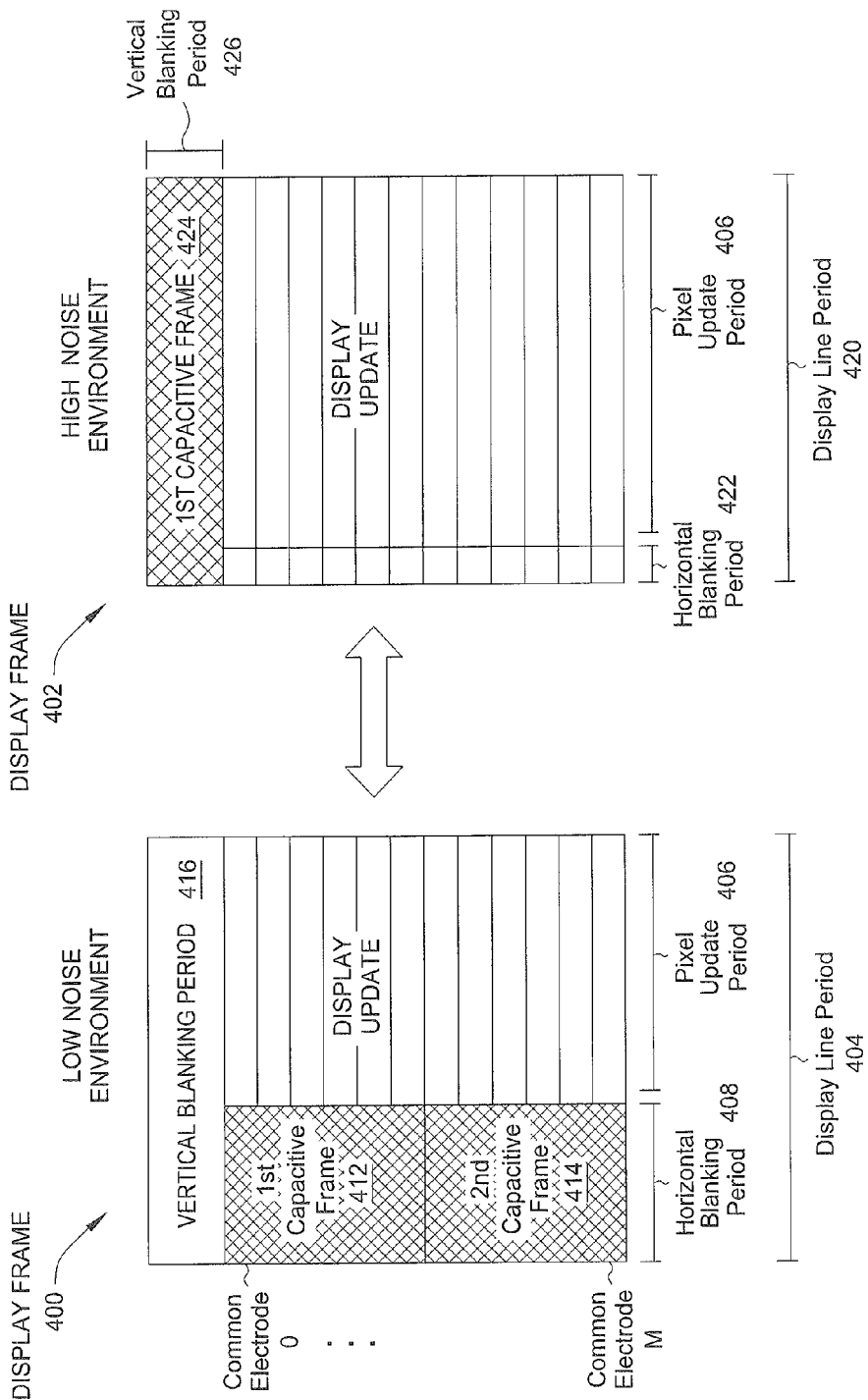
FIG. 4 illustrates timing charts for driving a display having an integrated input device, according to one embodiment disclosed herein.
Figure 5:
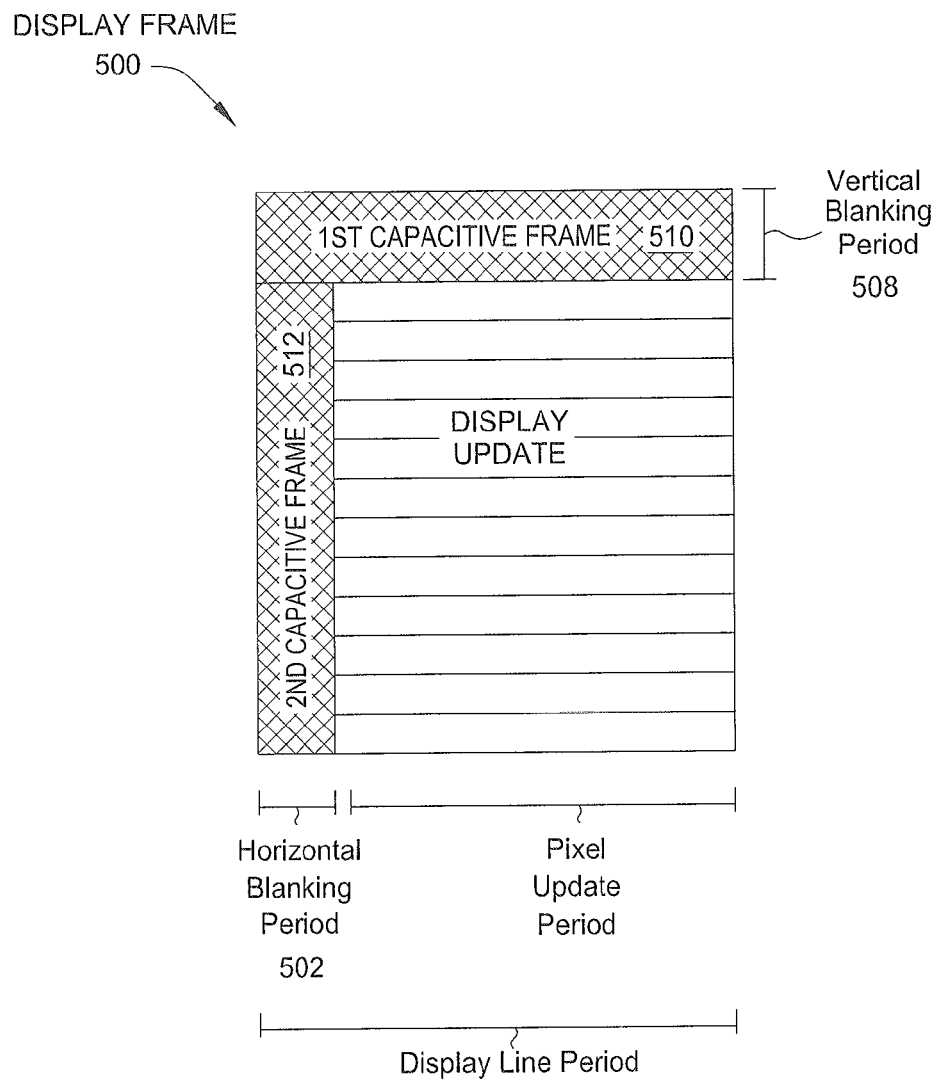
FIG. 5 illustrates a timing chart for an alternative scheme for driving the display having an integrated input device, according to one embodiment disclosed herein.

FIG. 3 illustrates a method 300 of mitigating noise for capacitance sensing with display updating, according to one embodiment of the present disclosure. The method 300 starts at step 302, where the processing system 110 drives, using driver circuitry 204, common electrodes for capacitive sensing during a first capacitive sensing period and during a second capacitive sensing period. The processing system 110 may use a variety of timing and sensing schemes with different capacitive sensing periods to perform capacitive sensing concurrently with display updating while mitigating noise, as described in detail below. In some embodiments, the first capacitive sensing period may be comprised of a plurality of non-display update periods during horizontal blanking of a display synchronization signal (referred to as "HBlanks" or "horizontal blanking periods"), as illustrated in FIG. 4. In some embodiments, the capacitive sensing period may be vertical blanking periods occurring at the beginning or end of a display frame, as illustrated in FIG. 5. In some embodiments, the first capacitive sensing period or the second capacitive sensing period may be comprised of in-frame blanking periods, described further below. In some embodiments, the processing system 110 may drive transmitter signals during alternating capacitive sensing periods with different transmitter signal frequencies, as described in conjunction with FIG. 6.

Referring again to the method 300, at step 304, the processing system 110 operates the common electrodes for interference sensing. In such embodiments, operating the common electrodes for interference sensing comprises driving the one or more common electrodes with a substantially constant voltage signal or electrically floating the one or more common electrodes.

At step 306, the processing system 110 receives, from receiver electrodes, first resulting signals during the first capacitive sensing period, second resulting signals during the second capacitive sensing period, and third resulting signals when the common electrodes are operated for interference sensing.

At step 308, the processing system 110 acquires a first capacitive image based on the first resulting signals and a second capacitive image based on the second resulting signals. At step 310, the processing system 110 determines an interference measurement based on the third resulting signals received when the common electrodes are operated for interference sensing.

At step 312, the processing system 110 determines whether the interference measurement exceeds a threshold value. In some embodiments, the threshold value may be selected such that interference measurements equal to or less than the threshold value are indicative of a low noise environment, and interference measurements that exceeds the threshold value are indicative of a high noise environment. In some embodiments, the processing system 110 may determine a high noise environment responsive to determining the interference measurements meets or exceeds the threshold value.

At step 314, responsive to determining the interference measurement does not exceed the threshold value, the processing system 110 determines positional information based on the first capacitive image. Otherwise, at step 316, responsive to determining the interference measurement exceeds the threshold value, the processing system 110 determines positional information based on the second capacitive image.

Accordingly, embodiments of the present disclosure enable adaptive switching between which periods of time within a display frame are used for capacitive sensing based on the measured noise affecting the input device. In some embodiments, the processing system 110 may switch between non-display update periods occurring between display line updates in low noise environments and non-display update periods occurring prior to the first display line update in a given display frame in high noise environments. In some embodiments, the processing system 110 may be configured to switch to using non-display update periods that enable for extended "gear-shifting" of the sensing frequency used for capacitive sensing.

A common electrode may be configured to transmit signals for display updating during a pixel update period. In one embodiment, each common electrode of a plurality of common electrodes sequentially transmits signals for display updating. In various embodiments, multiple common electrodes may transmit signals for capacitive sensing during a non-display update period. In one embodiment, the non-display update period comprises at least one of a horizontal blanking period, an in-frame blanking period and a vertical blanking period, some of which are shown in greater detail in FIG. 4.

FIG. 4 illustrates timing charts for driving a display having an integrated input device, according to one embodiment of the present disclosure. Specifically, the timing charts illustrate the different time periods in a display frame 400 or 402. It should be appreciated that the area of display frames 400 and 402 represent the amount of time to update a display, or the frame period. It should be further appreciated that while intervals and timing occurring within the display frames 400 and 402 may be different, the area of display frames 400 and 402 are shown to be same whether the processing system 110 is operating in a low noise environment or to a high noise environment.

As shown, different time periods are designated during which common electrodes 0-M may sequentially transmit signals for display updating during a corresponding "pixel update" period in the display frame. The display line update period 404 represent the time used to update a single display line of a display screen in the input device, such as the input device 100. This display line update time is further divided into a time period 406 used to update the pixels of the display line and a buffer time, also referred to as a horizontal blanking period 408, which occurs between each display line update period 404. The driver module may use the horizontal blanking period 408 to, for example, retrieve data needed to update the next display line, drive a voltage onto the common electrode(s) corresponding to the display line, or allow signals to settle to reduce interference when updating subsequent display lines. Nonetheless, the embodiments disclosed herein are not limited to an input device with a horizontal blanking period 408 and may be used in a system where there is no substantial buffer time between the pixel update period 406 and the next display line update period 404. In various embodiments, the horizontal blanking period 408 is reduced in length such that it is substantially non-existent. In other embodiments, the horizontal blanking period 408 is reduced in length such that it is no longer than the time needed to configure a common electrode to update a display line (e.g., as in display frame 402)

In one embodiment, to achieve a capacitive sensing frame rate (e.g., 80 Hz, 120 Hz, 160 Hz, etc.) that is synchronized with the quiet periods of a slower display refresh frame rate (e.g., 60 Hz), the processing system 110 is configured to distribute time used for capacitive sensing across horizontal blanking periods 408 occurring between pixel update periods 406, which may occur once per display line update period 404, for common electrodes 0-M during a display frame 400. As shown, a first capacitive frame 412 may be obtained during a first plurality of horizontal blanking periods 408 of the display frame 400, and a second capacitive frame 414 may be obtained during a second plurality of horizontal blanking periods 408 of the display frame 400. When in the presence of narrowband noise, the processing system 110 may "gear-shift" the frequency of the touch transmitter signal so as to avoid the noise frequency. In some embodiments, the display line period may be shortened or lengthened to change the frequency of the touch transmitter signal.

For example, assume a 640-line display has a minimum time to refresh one of the pixel update periods 406 of 15 μs. The frame time (e.g., display frame 400) is fixed at 16.667 ms, which results in a 60 Hz frame rate. During times of low noise interference, a typical vertical blanking period (e.g., vertical blanking period 416) of 20 lines may be used, such that the display frame contains 640+20=660 display line periods. As such, the display line period is 25.25 μs (i.e., 16.6667 ms/660). This provides 10.25 μs (i.e., 25.25−15 μs) of "quiet" horizontal blanking interval 408 per display line period 404. Since there are 660 display line periods per display frame, there is 6.767 ms (i.e., 10.25*660) of total time available for capacitive sensing. The first capacitive frame may occur during the horizontal blanking periods of the first 330 display line periods (i.e., 660/2=330 display line periods). The second capacitive frame may occur during the horizontal blanking periods of the remaining 330 display line periods. Accordingly, there are two touch frames per display frame (i.e., for a display frame rate of 60 Hz; a touch frame rate of 120 Hz) and these touch frames 412, 414 may be uniformly spaced in time. In some embodiments, the vertical blanking period 416 may be shortened, for example from 20 lines to 10 lines, to provide additional time for capacitive sensing to be performed during horizontal blanking periods or in-frame blanking periods.

While FIG. 4 depicts the first capacitive sensing period as horizontal blanking periods 408 interleaved with pixel update periods 406, it should be appreciated that other time intervals may be used as the first capacitive sensing period. For example, the first capacitive sensing period may include an in-frame blanking period (also referred to interchangeably as long horizontal blanking period, "long h-period", distributed vertical blanking period, or an in-frame blanking period), which are longer than the horizontal blanking periods 408 and, in some embodiments, are at least as long as a pixel update period 406 or the display line update period 404. Stated differently, the driver module may perform capacitance sensing during a capacitive sensing period that is at least as long as a pixel update period 406 and a horizontal blanking period 408. In some embodiments, the in-frame blanking period may be used for transmitter signal frequency shifting since the in-frame blanking period allows for contiguous capacitive sensing. It should be recognized that the duration of the capacitive sensing periods may be adjusted according to the particular design of the input device. It is appreciated that the in-frame blanking periods are distinguished from the vertical blanking periods 416 or 426 since in many embodiments, the vertical blanking periods fall before or after all of the display lines of the display frame have been updated, while the in-frame blanking periods are inserted between display line update periods 404 of the same display frame.

In one embodiment, during times of high noise interference (e.g., as determined in step 312 above), the processing system 110 is configured to switch to obtaining capacitive frames during a second plurality of non-display update periods, such as a vertical blanking period 426 in display frame 402. In many embodiments, the vertical blanking period 426 refers to the period between the last display line update period of a display frame and the beginning of a display line update period in a subsequent display frame. As such, from the perspective of a single display frame, the vertical blanking period 426 may refer to a time period occurring at the beginning of that display frame or at the end of that display frame. In many embodiments, the vertical blanking period may also be referred to the time period before a display frame is updated. In one embodiment, the processing system 110 is configured to perform an entire frame of touch sensing within the vertical blanking period 426 and obtain a first capacitive frame 424 from therein. In some embodiments, the frequency of touch sensing cycles may be adjusted within the longer contiguous time interval of the vertical blanking period 426 to better avoid the noise frequencies.

In some embodiments, to allow for additional time to be allocated to other intervals within the display frame 402, such as the vertical blanking period 426, the display line period 420 of the display frame 402 is decreased. As shown, the horizontal blanking periods 422 of the display frame 402 are greatly reduced. For example, the display line period may be reduced from 25.25 µs to 18.5 µs, which leaves 3.5 µs for horizontal blanking. The number of shortened display line periods per frame increases to 900 display line periods (i.e., 16.667 ms/18.5 µs=900 display line periods). As such, the vertical blanking period may be increased to 4.815 ms (i.e., 18.5 µs*(900−640)=4.815 ms). In various embodiments, it may be appreciated that since the vertical blanking period occurs at a fixed rate per a display refresh frame, the capacitive frame rate is also fixed. For example, it may be appreciated that since the vertical blanking period 426 occurs once per 60 Hz display refresh frame, the capacitive frame rate also remains at 60 Hz. It may be further appreciated that the overall display update frame rate remains at 60 Hz, and the minimum time to update one display line (e.g., 15 µs) is not exceeded.

Although not shown in FIG. 4, display frames 400 or 402 may also include a second vertical blanking period at the beginning of updating a display based on a received display frame. As such, in an alternative embodiment, when in a high noise environment, the vertical blanking period 426 of the display frame 402 may be partitioned into two halves, with one half occurring at the start of the frame period and the second half inserted within the frame period. In one embodiment, the second half may be inserted into the middle of the frame period or at another portion of the frame period. This would allow a capacitive frame to be inserted into each such partition, maintaining a 120 Hz capacitive frame rate. Because the input device does not update the display during these vertical blanking periods 416 or 426, in some embodiments, the driver module may also use either the first or the second vertical blanking periods (or both) to perform capacitance sensing. The vertical blanking periods 426 facilitate contiguous capacitive sensing since these blanking periods may provide a sufficient length of time to measure the change in capacitance associated with a selected common electrode without significant interruptions.

In some embodiments, the processing system 110 may be configured to switch from acquiring capacitive frames from a first capacitive sensing period comprised of horizontal blanking periods 408 to a second capacitive sensing period may include one or more in-frame blanking periods (i.e., that occur after a first display line update period and before a second display line update period of a display frame, and the first non-display period being at least as long as the first display line update period.)

FIG. 5 illustrates an alternative timing scheme for driving a display having an integrated input device, according to one embodiment of the present disclosure. As shown, the processing system 110 may be configured to obtain a first capacitive frame 510 during a vertical blanking period 508 of the display frame 500, and obtain another capacitive frame 512 distributed amongst the horizontal blanking periods 502 of the same frame 500. While not shown in FIG. 5, it is contemplated that in some embodiments, the processing system 110 may be configured to obtain a second capacitive frame 512 during one or more in-frame blanking periods of the same frame 500.

In one embodiment, in a low noise environment (e.g., as determined in step 312 above), the processing system 110 may use both capacitive frames 510 and 512, giving a net capacitive frame rate of twice the display frame rate. In a noisy environment, the processing system 110 may use the capacitive frame 510 from the vertical blanking period 508, and discard the capacitive frame 512 obtained during the horizontal blanking periods 502. Alternatively, in a noisy environment, the processing system 110 may continue to use both capacitive frames 510 and 512, and may discard any "ghost fingers" or other interference related artifacts (i.e., false indication of input object presence due to noise) that occur only in the capacitive frame 512 from the horizontal blanking periods 502.

Noise Mitigation Using Multiple Sensing Frequencies

In some embodiments, the sensing frequency for capacitive sensing in horizontal blanking periods may be determined by the duration of horizontal blank periods. It has been determined that this correlation usually pushes the sensing frequency towards a cutoff frequency of the common electrodes. As a result, a baseline used to adjust the capacitive images may have a significant slant along the axis of common electrodes (e.g., transmitter electrodes).

In these conditions, it has been determined that a slight change in a sensing period and/or an increment in the number of sensing pulses in the horizontal blanking periods produces a shift in positions of the susceptibility peaks on the frequency axis of the susceptibility plot of the processing system, which may be sufficient to provide attenuation by at least 30 dB of an interferer at a sensing frequency. However, a traditional frequency shifting approach, where a sensing frequency is changed and data continues to be acquired while staying on it may be limited, as a baseline would be different for each sensing frequency. In some cases, baseline images are retaken or updated periodically to accommodate for environmental changes (e.g., such as the effects of temperature drift or shock), to remove errors caused by the existing baseline image (e.g., false positives or negatives in detecting input in the sensing region), and the like. These adjustments (sometimes referred to as "relaxation") would be applied to only one of the baselines corresponding to the current sensing frequency.

Accordingly, embodiments of the present disclosure provide a noise mitigation approach that alternates between available sensing frequencies in different capacitive frames. In one embodiment, capacitive sensing may be performed (e.g., during horizontal blanking periods 408) to produce at least two capacitive frames per display frame: an odd frame and an even frame. In one embodiment, the processing system 110 may be configured to acquire odd capacitive frames at one sensing frequency, and acquire even capacitive frames at a difference frequency. For sake of discussion, the approach is described in terms of a first and second transmitter signal frequency used for odd and even capacitive frames; however it should be recognized that the described technique may be applied generally to a set of any number of sensing frequencies.

Figure 6:
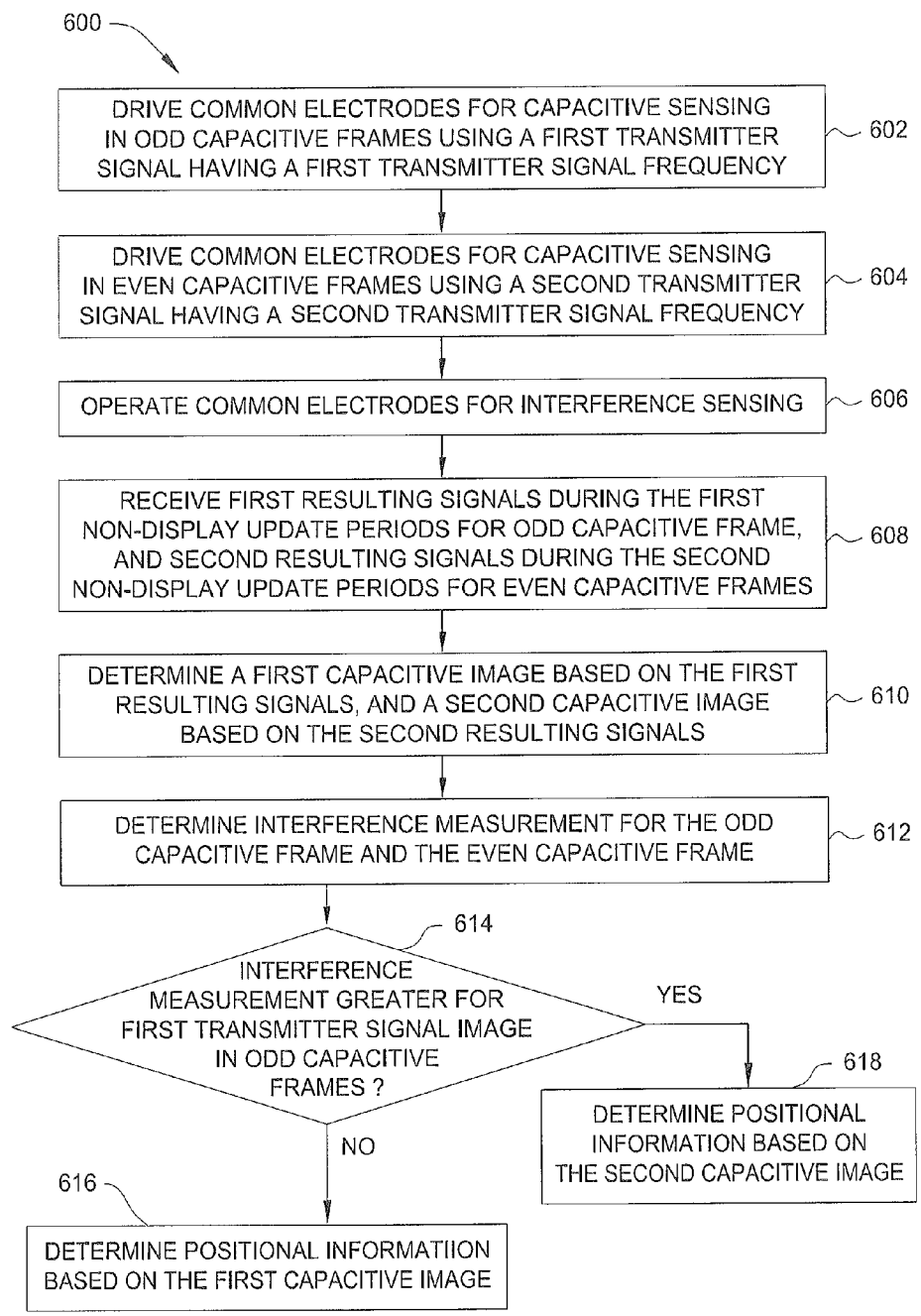
FIG. 6 illustrates a flow diagram of a method of mitigating noise using multiple transmitter signal frequencies for capacitance sensing, according to an embodiment disclosed herein.

FIG. 6 illustrates a method 600 for mitigating noise using multiple transmitter signal frequencies for capacitance sensing, according to one embodiment of the present disclosure. The method 600 starts at step 602, where the processing system 110 drives, using driver circuitry 204, common electrodes for capacitive sensing during a first capacitive sensing period using a first transmitter signal having a first transmitter signal frequency. In some embodiments, the first capacitive sensing period may be a plurality of non-display update periods comprised of horizontal blanking periods (e.g., horizontal blanking periods 408) within a display frame, and may be used to acquire every odd capacitive frame.

At step 604, the processing system drives, using the driver circuitry 204, common electrodes for capacitive sensing during a second plurality of non-display update periods using a second transmitter signal having a second transmitter signal frequency. In some embodiments, the second plurality of non-display update periods may be horizontal blanking periods (e.g., horizontal blanking periods 408) within the same display frame, and are used to acquire every even capacitive frame. As such, the common electrodes are driven using different transmitter signal frequencies in different frames. For example, the common electrodes may be driven using a "2 sensing cycles" configuration to acquire every odd capacitive frame, and using a "3 sensing cycles" configuration to acquire every even capacitive frames.

In one embodiment, the processing system 110 may maintain a separate baseline for capacitive frames acquired at a different transmitter signal frequency. That is, a first baseline may be maintained for odd frames acquired using a first transmitter signal frequency, and a second baseline may be maintained for even frames acquired using a second transmitter signal frequency.

At step 606, the processing system 110 operates the common electrodes for interference sensing. In some embodiments, operating the common electrodes for interference sensing may include driving the one or more common electrodes with a substantially constant voltage signal or electrically floating the one or more common electrodes.

At step 608, the processing system 110 receives, from receiver electrodes, first resulting signals during the first capacitive sensing period, second resulting signals during the second capacitive sensing period, and third resulting signals when the common electrodes are operated for interference sensing. At step 610, the processing system acquires a first capacitive image based on the first resulting signals and a second capacitive image based on the second resulting signals.

At step 612, the processing system 110 determines an interference measurement for the odd capacitive frames that were acquired based on the first transmitter signal frequency and for the even capacitive frames acquired that were acquired based on the second transmitter signal frequency. In some embodiments, the processing system determines interference measurements based on resulting signals received when the common electrodes are operated for interference sensing (e.g., at step 606). In some embodiments, noise detection may be further facilitated by a comparison of odd and even capacitive frames and/or touch parameters extracted therefrom.

At step 614, the processing system determines whether the interference measurement is greater for the first transmitter signal frequency in odd capacitive frames. If so, at step 616, responsive to determining a noisy environment exists for the first transmitter signal frequency, the processing system determines positional information based on the second capacitive image, which is acquired using the second transmitter signal frequency. That is, the processing system may drop the noisy frames in favor of the alternative frames. Otherwise, at step 618, responsive to determining that the interference measurement is not greater for the first transmitter signal frequency, the processing system 110 determines positional information based on the first capacitive image. In some embodiments, infinite impulse response (IIR) filtering of pixels in capacitive frames can be adjusted for constant latency for both odd and even capacitive frames by dynamic modifications to the IIR's coefficient correcting for the periods of dropped out frames independently for odd and even frames.

In some embodiments, instead of, or in addition to, dropping noisy frames, the processing system 110 may vary a proportion of capacitive frames acquired using the first transmitter signal frequency to capacitive frames acquired using the second transmitter signal frequency, to acquire more quiet frames. As such, the processing system 110 may increase an amount of capacitive frames acquired using a certain transmitter signal frequency based on the interference measurement.

In view of the foregoing, the scope of the present disclosure is determined by the claims that follow. However, those skilled in the art will recognize that the foregoing description and examples have been presented for the purposes of illustration and example only. The description as set forth is not intended to be exhaustive or to limit the invention to the precise form disclosed.

What is claimed is:

1. A processing system for a display device having an integrated capacitive sensing device, the display device comprising a plurality of common electrodes configured for display updating and capacitive sensing, the processing system comprising:
    a driver module comprising driver circuitry configured for coupling to the plurality of common electrodes and configured to drive the plurality of common electrodes for display updating and capacitive sensing;
    wherein the driver module is configured to drive the plurality of common electrodes for capacitive sensing during a first capacitive sensing period of a first display frame and a second capacitive sensing period, wherein the first capacitive sensing period comprises a first plurality of non-display update periods, wherein the driver module is further configured to operate the plurality of common electrodes for interference sensing;

a receiver module configured to receive first resulting signals during the first capacitive sensing period, second resulting signals during the second capacitive sensing period, and a third resulting signal when the plurality of common electrodes are operated for interference sensing; and a determination module configured to acquire a first capacitive image based on the first resulting signals, a second capacitive image based on the second resulting signals, and an interference measurement based on the third resulting signals;

wherein the determination module is configured to determine positional information based on the first capacitive image responsive to the interference measurement being less than a threshold value; and wherein the determination module is configured to determine positional information based on the second capacitive image responsive to the interference measurement exceeding the threshold value.

2. The processing system of claim 1, wherein the first plurality of non-display update periods comprises a plurality of horizontal blanking periods.

3. The processing system of claim 1, wherein the first plurality of non-display update periods comprises a first non-display period occurring after a first display line update period and before a second display line update period of a display frame, and the first non-display period being at least as long as the first display line update period.

4. The processing system of claim 1, wherein the second capacitive sensing period comprises a vertical blanking period of a second display frame.

5. The processing system of claim 4, wherein the determination module is further configured to shift from a first transmitter signal having a first transmitter signal frequency to a second transmitter signal having a second transmitter signal frequency to be used when driving the plurality of common electrodes for capacitive sensing during the second capacitive sensing period based on the interference measurement.

6. The processing system of claim 4, wherein the determination module is further configured to switch the driver module from a first timing scheme for driving the plurality of common electrodes for capacitive sensing during non-display update periods of a first type to a second timing scheme for driving the plurality of common electrodes for capacitive sensing during non-display update periods of a second type based on the interference measurement.

7. The processing system of claim 1, wherein the second capacitive sensing period comprises a vertical blanking period of the first display frame.

8. The processing system of claim 7, wherein the determination module is further configured to determine positional information based on both of the first capacitive image and the second capacitive image responsive to the interference measurement being less than the threshold value.

9. The processing system of claim 1, wherein the second capacitive sensing period comprises a second plurality of non-display update periods during the first display frame; and wherein the driver module is further configured to drive the plurality of common electrodes during the first plurality of non-display update periods at a first transmitter signal frequency and drive the plurality of common electrodes during the second plurality of non-display update periods at a second transmitter signal frequency different from the first transmitter signal frequency.

10. The processing system of claim 9, wherein the determination module is further configured to determine positional information based on a comparison of the first capacitive image to a first baseline image responsive to the interference measurement being less than a threshold value; and wherein the determination module is further configured to determine positional information based on a comparison of the second capacitive image to a second baseline image responsive to the interference measurement exceeding the threshold value, the second baseline image being maintained independently from the first baseline image.

11. The processing system of claim 9, wherein the determination module is configured to modify a ratio of capacitive images acquired using the first transmitter signal frequency to capacitive images acquired using the second transmitter signal frequency based on a comparison of interference measurements associated with the first transmitter signal frequency and the second transmitter signal frequency.

12. A method for operating a display device having an integrated capacitive sensing device, the method comprising:

driving a plurality of common electrodes for capacitive sensing during a first capacitive sensing period of a first display frame and a second capacitive sensing period, wherein the first capacitive sensing period comprises a first plurality of non-display update periods;

operating the plurality of common electrodes for interference sensing;

receiving, from a plurality of receiver electrodes, first resulting signals during the first capacitive sensing period, second resulting signals during the second capacitive sensing period, and a third resulting signal when the plurality of common electrodes are operated for interference sensing;

determining a first capacitive image based on the first resulting signals, a second capacitive image based on the second resulting signals, and an interference measurement based on the third resulting signals;

responsive to the interference measurement being less than a threshold value, determining positional information based on the first capacitive image; and responsive to the interference measurement exceeding the threshold value, determining positional information based on the second capacitive image.

13. The method of claim 12, further comprising:

switching from a first timing scheme for driving the plurality of common electrodes for capacitive sensing during non-display update periods of a first type to a second timing scheme for driving the plurality of common electrodes for capacitive sensing during non-display update periods of a second type based on the interference measurement; and wherein the second capacitive sensing period comprises a vertical blanking period of a second display frame.

14. The method of claim 12, further comprising:

determining positional information based on both of the first capacitive image and the second capacitive image responsive to the interference measurement being less than the threshold value; and wherein the second capacitive sensing period comprises a vertical blanking period of the first display frame.

15. The method of claim 12, wherein the second capacitive sensing period comprises a second plurality of non-display update periods during the first display frame; the method further comprising:

driving the plurality of common electrodes during the first plurality of non-display update periods at a first transmitter signal frequency and drive the plurality of common electrodes during the second plurality of non-display update periods at a second transmitter signal frequency different from the first transmitter signal frequency.

16. The method of claim 12, wherein the determining the positional information further comprises:
determining positional information based on a comparison of the first capacitive image to a first baseline image responsive to the interference measurement being less than a threshold value; and
determining positional information based on a comparison of the second capacitive image to a second baseline image responsive to the interference measurement exceeding the threshold value, the second baseline image being maintained independently from the first baseline image.

17. A display device having an integrated capacitive sensing device, the display device comprising:
a plurality of common electrodes configured to be driven for display updating a plurality of display lines of a display screen of the display device and performing capacitive sensing;
a plurality of receiver electrodes; and
a processor coupled to the plurality of common electrodes and to the plurality of receiver electrodes, wherein the processor is configured to:
drive the plurality of common electrodes for capacitive sensing during a first capacitive sensing period of a first display frame and a second capacitive sensing period, wherein the first capacitive sensing period comprises a first plurality of non-display update periods;
operate the plurality of common electrodes for interference sensing;
receive first resulting signals on at least one of the plurality of receiver electrodes while driving during the first capacitive sensing period, second resulting signals during the second capacitive sensing period, and a third resulting signal when the plurality of common electrodes are operated for interference sensing;
acquire a first capacitive image based on the first resulting signals, a second capacitive image based on the second resulting signals, and an interference measurement based on the third resulting signals;
determine positional information based on the first capacitive image responsive to the interference measurement being less than a threshold value; and
determine positional information based on the second capacitive image responsive to the interference measurement exceeding the threshold value.

18. The display device of claim 17, wherein the first plurality of non-display update periods comprises a plurality of horizontal blanking periods, and the second capacitive sensing period comprises a vertical blanking period of a second display frame; and
wherein the processor is further configured to shift from a first transmitter signal having a first transmitter signal frequency to a second transmitter signal having a second transmitter signal frequency to be used when driving the plurality of common electrodes for capacitive sensing during the second capacitive sensing period based on the interference measurement.

19. The display device of claim 17, wherein the first plurality of non-display update periods comprises a plurality of horizontal blanking periods, and the second capacitive sensing period comprises a vertical blanking period of a second display frame; and
wherein the processor is further configured to switch from a first timing scheme for driving the plurality of common electrodes for capacitive sensing during non-display update periods of a first type to a second timing scheme for driving the plurality of common electrodes for capacitive sensing during non-display update periods of a second type based on the interference measurement.

20. The display device of claim 17, wherein the second capacitive sensing period comprises a second plurality of non-display update periods during the first display frame;
wherein the processor is further configured to drive the plurality of common electrodes during the first plurality of non-display update periods at a first transmitter signal frequency and drive the plurality of common electrodes during the second plurality of non-display update periods at a second transmitter signal frequency different from the first transmitter signal frequency.

* * * * *